United States Patent [19]
Wang

[11] Patent Number: 5,317,574
[45] Date of Patent: May 31, 1994

[54] METHOD AND APPARATUS FOR GENERATING X-RAY AND/OR EXTREME ULTRAVIOLET LASER

[76] Inventor: Hui Wang, 540 Canyon Woods Cir. #108, San Ramon, Calif. 94583

[21] Appl. No.: 999,127

[22] Filed: Dec. 31, 1992

[51] Int. Cl.⁵ .................... H01S 3/097; H01S 3/30
[52] U.S. Cl. ............................................. 372/5; 372/87
[58] Field of Search .................................... 372/5, 87

[56] References Cited

U.S. PATENT DOCUMENTS

| | | | |
|---|---|---|---|
| 4,042,827 | 6/1977 | McCorkle | 250/493 |
| 4,053,783 | 11/1977 | Scully | 250/493 |
| 4,380,072 | 7/1983 | Harris | 372/5 |
| 4,504,955 | 3/1985 | Macklin et al. | 372/76 |
| 4,589,113 | 6/1986 | Hagelstein | 372/5 |
| 4,649,544 | 3/1987 | Haas et al. | 372/22 |
| 4,704,718 | 8/1987 | Suckewer | 372/5 |
| 4,731,786 | 2/1988 | MacGowan | 372/5 |
| 4,827,479 | 3/1989 | Campbell | 372/5 |
| 4,875,214 | 10/1989 | Denne | 372/5 |
| 4,937,832 | 4/1990 | Rocca | 372/5 |
| 4,977,572 | 8/1990 | Nilsen | 372/69 |
| 5,107,510 | 4/1992 | Seguin et al. | 372/25 |
| 5,117,432 | 5/1992 | Nilsen | 372/5 |

OTHER PUBLICATIONS

M. D. Rosen et al. Physical Review Letters 54, 106 (1985).
D. L. Matthews, Physical Review Letters 54, 110 (1985).
J. P. Apruzese, et al. SPIE Proc. 875, 2 (1988).
S. Suckewer, Physical Review Letter 55, 1753 (1985).

*Primary Examiner*—Frank Gonzalez

[57] ABSTRACT

A method and apparatus for producing x-ray and/or extreme ultraviolet (EUV) is described. A liquid edge 2 is electrically connected to a cathode 8 via a high voltage pulse power supply 10. Liquid edge 2 is set to be parallel to cathode 8. When high voltage pulse power supply 10 is turned on, a vacuum discharge will occur in a space between liquid edge 2 and cathode 8. The plasma will be confined into a high density and high temperature thin plasma column 4 in a space near liquid edge 2 by strong magnetic field induced by the huge discharge current. A population inversion in the confined plasma column will lead to a amplified simultaneous emission of x-ray and/or EUV 6 along the axis of plasma column 4. Moreover, a large power x-ray and-/or EUV laser can be built by using multi-liquid edge-shape anodes placed in a straight line and operated in a traveling-wave mode.

31 Claims, 8 Drawing Sheets

METHOD AND APPARATUS FOR GENERATING X-RAY AND/OR EXTREME ULTRAVIOLET LASER

TECHNICAL FIELD

The instant invention relates to a novel method and apparatus for generating a large power, high efficiency, and low cost X-ray laser and/or extreme ultraviolet (EUV) laser.

BACKGROUND OF THE INVENTION

The basic requirement of any laser is existence of population inversion between two atomic or molecular states in a gaseous or a solid material so that decay by stimulated emission may yield amplification. The production of population inversion needs pumping energy. In the case of conventional laser, the photon energies are eV order, and transition lifetime is nanosecond order. However, in the case of X-ray lasers the photon energies are hundreds or thousands eV order, and the transition life time is less than picosecond. This means that X-ray laser needs a large amount of pumping energy to be brought into the active medium in a very short time.

Much efforts have been done toward the development of x-ray and/or extreme ultraviolet (EUV) laser since the conventional lasers appeared in 1960. It was not until recently that soft x-ray lasers were successfully operated. The first operational laboratory X-ray laser is reported by Rosen et al in Physical Review Letters 54, 106 (1985), and experimentally demonstrated by Matthews et al in Physical Review Letters 54, 110 (1985). This seminal X-ray laser system is also fully disclosed by Campbell et al in U.S. patent application Ser. No. 676,338 filed Nov. 29, 1984. A related short wavelength laser, whose output extends into the EUV and X-ray region, is disclosed by Hagelstein in U.S. Pat. No. 4,589,113 issued May 13, 1986. However, those soft x-ray lasers are very large apparatus requiring very large energy lasers as the excitation source, typically delivering laser pulses of hundreds of Joules to kilojoules at longer wavelength. The cost, complexity, and size of the equipment required to form such x-ray laser apparatus make them impractical for most technical and scientific applications. Another disadvantage of these types of lasers is the low energy converting efficiency. This is because the energy converting process is from the electrical energy into long wavelength laser radiation, and then using the long wavelength laser to create a plasma from which the x-ray laser light emits.

Another approach for generating a x-ray laser is to directly deposit electrical energy in a plasma column which lases x-ray. These types of x-ray lasers are more direct and potentially more efficient than those driven by conventional laser drivers. Moreover, they use capacitors as energy sources to excite the plasma, and the size of the capacitor storing the same amount of energy as that of the laser driver output is much smaller than the size of the laser driver. There are two types of electrical discharge x-ray lasers: 1) Z-pinch discharge; 2) Capillary discharge. A power of 25 GW has been measured from 11 Å spectral line in Z-pinch discharge by J. P. Apruzese, et al. in SPIE Proc. 875, 2 (1988). However, this Z-pinch x-ray laser is difficult to be combined with resonator for making large power, high coherent x-ray laser. In the capillary discharge type x-ray laser, a capillary tube is used to confine a column plasma which lases x-ray. The pulse duration in most of such capillary discharge type x-ray lasers tested to date is in the 100s of nanoseconds range. Because of interactions with the wall of the capillary on such time scales, the temperature of plasma has been limited to a few tens of eV. Therefore, the capillary discharge is difficult to be used for generating x-ray laser in a wavelength shorter than 100 Å.

SUMMARY OF THE INVENTION

It is an object of the invention to provide a novel method and apparatus for producing X-ray and/or EUV laser.

It is an additional object of the invention to provide an electron collisional excitation pumped x-ray and/or EUV laser.

It is a further object of the invention to provide an electron-collisional recombination pumped x-ray and/or EUV laser.

It is a further object of the invention to provide a photoexcitation pumped x-ray and/or EUV laser.

It is still a further object of the invention to provide a charge transfer pumped x-ray and/or EUV laser.

It is a further object of the invention to provide an photoionization pumped x-ray and/or EUV laser.

It is still a further object of the invention to provide a large power multi-plasma-column X-ray laser.

The above and other objects of the invention are accomplished by the provision of a method for producing X-ray and/or EUV laser, comprising: forming an edge-shape anode electrode by liquid material; and generating a vacuum discharge between the anode electrode and the cathode electrode spaced apart from the anode electrode of sufficient huge discharge current to induce strong magnetic field to confine the plasma column in a space close to the anode. The confined plasma column lases x-ray and/or EUV laser.

In the further aspect of the invention there is provided a apparatus for generating x-ray and/or EUV laser, comprising: a liquid edge-shape anode including liquid material, a reservoir for holding the liquid material, the reservoir having an opening for passage of the liquid material, and liquid material feeding and liquid edge forming means operatively associated with the reservoir for feeding liquid material through the opening in the reservoir and for forming a liquid edge-shape anode from the liquid material; an cathode opposite the liquid edge-shape anode; and pulse power supply means connected to the liquid edge-shape anode and cathode for generating a vacuum discharge of sufficient huge discharge current to induce strong magnetic field to confine the plasma to a thin column in a space close to the anode. X-ray and/or EUV laser is lased from the thin plasma column.

One important advantage of this apparatus is that a column plasma with high electron temperature and high density of ions of the desired specie of charge Z can be produced. This feature promotes generation of population inversion which is created by electron-collisional excitation hereinafter described.

ELECTRON-COLLISIONAL EXCITATION LASERS IN LIQUID EDGE-SHAPE ANODE DISCHARGE

The generation of population inversions by electron-collisional excitation is the one of the most useful mechanisms to create population inversion in the liquid edge-shape anode discharge. Electron-collisional excitation is inherently cw in that the initial and final laser states are ground level, and that only one ionic specie is involved. It also has the advantage that lower-state opacity is often relatively low, so that diameters measured in fractions of millimeter and length in centimeters are reasonable scales. Because it operates on $\Delta n=0$ transitions, it requires high temperature electron to excite high-Z atoms into high-Z charged ion and a large amount of ionization energy. The features of huge discharge current and high discharge voltage in the liquid edge-shape anode discharge disclosed in this patent make above requirements be easily satisfied. It is also possible that both high electron temperature and a large density of ions of the desired specie of charge Z exist simultaneously. Of cause, it is necessary to adjust the discharge conditions such as voltage, current, and pulse length so that the electron temperature values at which significant excitation occurs have to be achieved before the plasma is over-ionized and the ions of the lasing specie Z destroyed. Also, the electron density should be controlled to be moderate to avoid refraction loss in the laser beam as it passes through the plasma column.

Using electron-collisional excitation in the liquid edge-shape anode discharge disclosed in this patent, laser action can be achieved, for example, in Neon-like ions(i.e., ions with electronic structure of a neutral neon atom), such as neon-like $Ge^{22+}$ at 23.2 nm. Nickel-like ions are also a useful type of ions for the generation of the soft x-ray laser radiation.

ELECTRON-ION RECOMBINATION LASERS IN LIQUID EDGE-SHAPE ANODE DISCHARGE

The generation of population inversion by electron-ion recombination is another major mechanism to create population inversions in a liquid edge-shape anode discharge. Electron-ion recombination, sometime referred to as "three-body" recombination, is an inverse process to the electron-collisional ionization from excited levels. This happens when plasma rapidly cools at the end of the excitation pulse by either adiabatic expansion, radiation or electron heat conduction. The rapid decrease in the plasma temperature causes the electrons and ions from the plasma to recombine, creating population inversion between excited levels of the lesser charge ions. Again radiation with a photon energy corresponding to the energy difference between the inverted levels is amplified. In this recombination process, the most important thing is rapid cooling. In the present invention, large electron heat conduction from the hot column plasma to the liquid edge-shape anode adds to other heat losses, such as radiative losses, to rapidly cool the column plasma, inducing large electron-ion recombination rates. The electron heat conduction cooling rate can be enhanced by the close proximity of the liquid edge-shape anode to the column plasma. The distance between the liquid edge-shape anode and the column plasma can be adjusted by the discharge conditions such as, voltage, current, pulse length, apex radius of the anode, geometry of the cathode and the distance between the anode and the cathode. Radiative losses can be enhanced by adding a heavy atom(high Z atom) to the liquid edge-shape anode discharge. Such heavy atoms can be introduced by mix liquid material with heavy atom material or by selectively introducing a gas containing heavy atoms. In any case, rapid recombination of highly ionized ions of charge $Z+1$ into excited levels of ions of charge Z induces the generation of population inversions in the ions of charge Z and results in the amplification at x-ray and EUV wavelengths. For the occurrence of laser action a plasma density has to be achieved such that a large density of ions with charge $Z+1$ is created. Nevertheless the plasma density has to remain below a maximum value at which collisional electron de-excitation of the laser's upper lever, or trapping of lower laser resonant radiation will destroy the population inversions.

PHOTOEXCITATION AND/OR PHOTOIONIZATION LASERS IN LIQUID EDGE-SHAPE ANODE DISCHARGE

Photoexcitation and/or photoionization can also produce population inversion in liquid edge-shape anode discharge. The hot plasma region near the core of column plasma acts as a flash lamp to produce x-ray radiation that can excite or ionize lower ionized atoms, or atoms from a different species that exist in the cooler plasma region that close to liquid edge-shape anode, thus a population inversion in cooler plasma region is created.

CHARGE TRANSFER COLLISIONAL LASERS IN LIQUID EDGE-SHAPE ANODE DISCHARGE

A level-selective pumping in liquid edge-shape anode discharge can be done by resonance charge transfer. In this method of pumping, the ions acquire electrons in an upper laser state from neutral atoms or lower ionized species, rather than from free electron. Because the atomic process has a large cross-section, the charge transfer collisional laser can be operated at reduced density. Ionized species of charge Z created by electron-collisional ionization in the hot region of the plasma near the core of the column plasma can diffuse to the cooler plasma region near the liquid edge-shape anode, undergoing charge transfer collision with atoms, or lower ionized species. In this process, an electron is transferred from an atom or lower ionized specie into an ion of charge Z, thus a population inversion is created in the ion of charge state $Z-1$. In order to obtain large charge transfer rate, i.e., high density of population inversion, the ionization energy of atoms or lower ionized species have to closely match the energy difference between the ground state of specie Z and the selected laser upper level in specie $Z-1$.

Except the advantages and features mentioned above, the x-ray and/or EUV laser produced in accordance with the method and apparatus of the invention has a number of other special advantages, including: 1) liquid edge-shape anode is self-replenishing and self-healing, leading to stable liquid anode shape and a life time as long as liquid material is feed into the anode; 2) a large power x-ray and/or EUV laser consists of multi-liquid edge-shape anodes placed in a straight line can be operated in traveling-wave mode, leading to a large power, highly coherent x-ray and/or EUV laser.

The above and other advantages and features of the invention allow the inventive x-ray and/or EUV laser to be used in many applications, such as atomic physics and accelerators, electron spectroscopy for chemical analysis, diagnostics of high density fusion plasma, nuclear decay process, radiation chemistry, x-ray microscope and x-ray holography for biomedical sample, x-ray radiography and x-ray holography in nondestructive evaluation of material and structure.

Further features and advantages of the invention will become apparent from a study of following portions of the specification, the claims and the attached draws.

BRIEF DESCRIPTION OF THE DRAWING

FIGS. 4A and 4B-FIGS. 6A and 6B are schematic views of alternative embodiments of a apparatus for generating x-ray and/or EUV laser in accordance with the present invention.

DESCRIPTION OF PREFERRED EMBODIMENT

In describing the various embodiments of the invention, corresponding parts in different figures are designated with the same reference number in order to minimize repetitive description.

Figure 1:
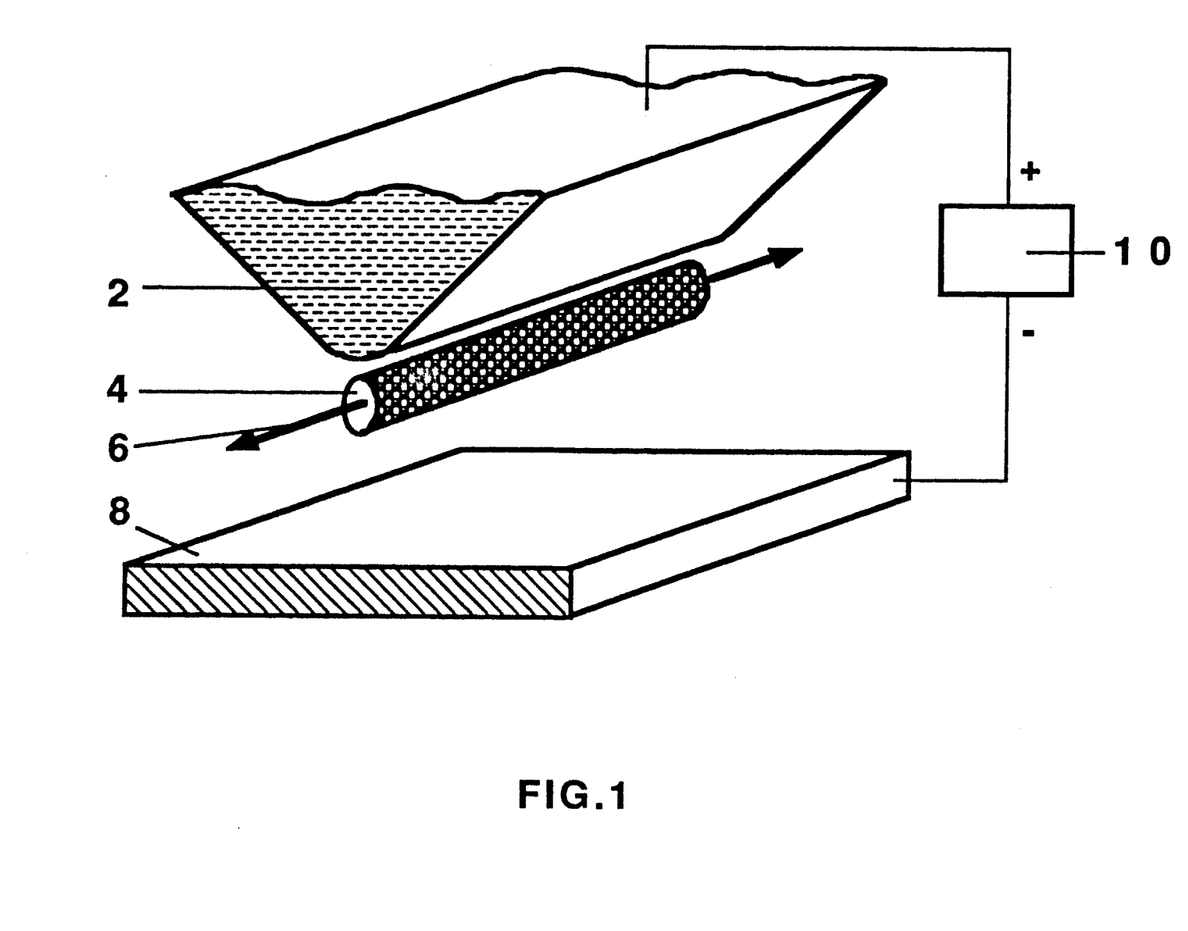
FIG. 1 is a generalized schematic diagram showing the method for generating x-ray and/or EUV laser in accordance with the present invention.

FIG. 1 is a schematic view illustrating the method for generating a x-ray and/or EUV laser in accordance with the present invention. A liquid edge 2 is electrically connected to a cathode 8 via a high voltage pulse power supply 10. Liquid edge 2 is set to be parallel to cathode 8, and both of them are disposed in vacuum. When high voltage pulse power supply 10 is turned on, a vacuum discharge will occur in a space between liquid edge 2 and cathode 8. The plasma will be confined into a high density and high temperature plasma column 4 in a space near liquid edge 2 by strong magnetic field induced by the huge discharge current. A population inversion in the confined plasma column will lead to a amplified simultaneous emission of x-ray and/or EUV 6 along the axis of plasma column 4.

Figures 2A, 2B:
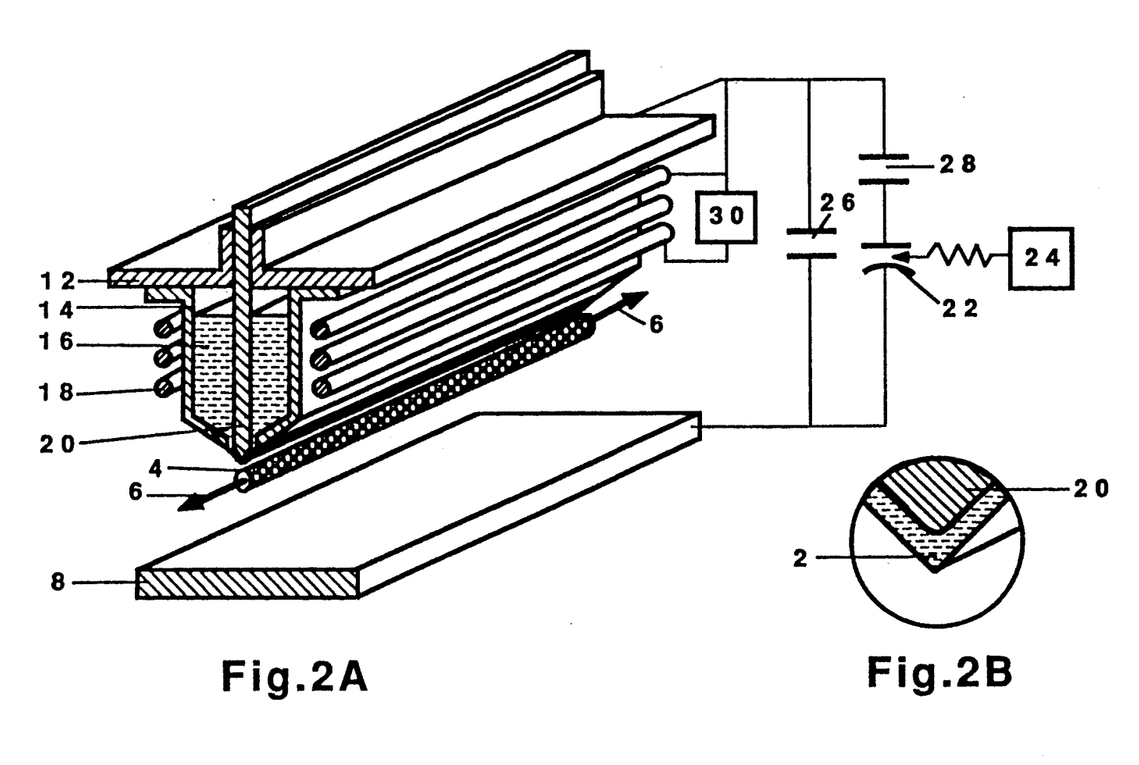
FIGS. 2A and 2B are schematic view of one embodiment of a apparatus for generating x-ray and/or EUV laser in accordance with the present invention.

FIG. 2A is a schematic view of one embodiment of the apparatus for generating x-ray and/or EUV laser in accordance with the present invention. A liquid edge-shape anode structure, described in detail in FIGS. 3A–3D, includes a edge-shape anode 20, a liquid material 16, a heater 18, a transmission line 12, and a reservoir 14 for supplying liquid material 16 to the end of edge-shape anode 20. FIG. 2B shows an enlarged view of the end of edge-shape anode 20. Liquid material 16 is most preferably made of material specifically selected for the generation of a plasma. For example, if an electron-collisional laser is to be constructed to produce laser radiation at the 23.2 nm of $3p$–$3s$ lasing line of Neon-like $Ge^{22+}$, liquid material can be made of Germanium. By way of further example, $B_{60}$-$Ni_{13}$-$Pt_{27}$ eutectic can be used as such a liquid material, especially in the case where laser action is to be achieved in Boron ions. By way of still a further example, if a recombination laser is to be constructed to produce laser radiation at the 12.9 nm of $4f$–$3d$ line of $Si^{11+}$, liquid material can be made of $Au_{69}$-$Si_{31}$ eutectic. Here, high Z gold atom can enhance radiative losses to rapidly cool the plasma. Preferably, the selected liquid material has a relatively low vapor pressure at their melting point, for example, lower than $10^{-4}$ Torr. Edge-shape anode 20 has a melting point higher than that of liquid material 16 and is substantially unreactive with liquid material 16 at the melting point of liquid material 16. Materials suitable for making edge-shape anode 20 include: Tungsten, Tantalum, Molybdenum, Nickel, Titanium, Platinum, Titanium carbide, Zirconium carbide, Boron nitride, Titanium boride, and $BN$-$TiB_2$ composite. Desirably, edge-shape anode 20 has an end with an apex radius in the range from 0.1 $\mu$m to 1,000 $\mu$m.

A heating filament 18 is provided adjacent to reservoir 14 such that a material of the specified type in solid phase during normal operation temperature of the x-ray laser may be placed in reservoir 14 and liquefied by heating filament 18. A heating power supply 30 provides a sufficiently heating current to heating filament 18. Heating filament 18 has the same potential as transmission line 12 and edge-shape anode 20.

Cathode 8, made of a metal or alloy conductor, preferably Copper because of its high electrical conductivity, is spaced apart and isolated from liquid edge-shape anode 20.

In laser operation, all elements described above are disposed in a vacuum chamber (not shown in FIGS. 2A and 2B), preferably, the vacuum pressure is lower than $10^{-6}$ Torr. A gas containing heavy atoms (high Z atoms) can be introduced into the vacuum chamber in order to rapidly cool plasma in electron-ion recombination excitation by radiative loss effect of heavy atoms.

Low impedance transmission line 12 and cathode 8 are connected to a capacitor 26, a capacitor 28 and a spark gap switch 22. First, capacitor 26 is charged to a potential not higher than threshold of vacuum discharge, usually this threshold is in the range of 10 kV to 20 kV. At this potential range, edge-shape anode 20 wet by liquid material 16 will form liquid edge 2 at its end in balancing between electrostatic and surface tension forces. The formed liquid edge 2 is called the Taylor cone, and usually has a apex radius smaller than 1 $\mu$m. This provides a sharp liquid edge suitable for generating a position stable, and uniform column plasma. Then capacitor 28 is charged to a potential at least higher than threshold of vacuum discharge. In order to provide large discharge current or high power necessary to generate x-ray laser, the capacitance of capacitor 28 should be sufficiently large, and the impedance of capacitor 28 and transmission line 12 should be very low. Connections among transmission line 12, capacitor 28, spark gap switch 22 and cathode 8 should be carefully done. When capacitor 28 is charged, a pulse from a high voltage trigger generator 24 turns on spark gap switch 22 and charges transmission line 12. At the same time, capacitor 26 will also be charged, which dilute the charging power to transmission line 12. So that the capacitance of capacitor 26 should be selected much smaller than that of capacitor 28. When transmission line 12 has been charged by capacitor 28, a vacuum discharge will occur in a space between liquid edge-shape anode 20 and cathode 8. Plasma column 4 will form in the space near liquid edge 2 by the confinement of strong magnetic field induced by the discharge current. X-ray and/or EUV laser will emit from plasma column 4.

Figure 3:
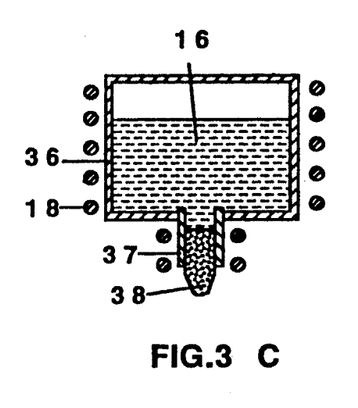
FIG. 3A–FIG. 3C are schematic cross section views of three different embodiments for forming a liquid edge-shape anode in accordance with the present invention.

FIG. 3A shows schematic cross section view of one embodiment of a liquid edge-shape anode structure in accordance with the present invention. A supply of liquid material 16 is stored in a reservoir 14 having a trough-shape opening 34 with a width wider than the thickness of edge-shape anode 20 disposed in reservoir 14 and projecting through trough-shape opening 34.

Reservoir 14 is made of a material, preferably Tungsten, having a melting point higher than that of liquid material 16. Liquid material 16 is most preferably made of material specifically selected for the generation of a laser, mentioned in FIG. 2A. The requirements for edge-shape anode 20 have been also described in FIG. 2A. Heating filament 18 is provided adjacent to reservoir 14 such that a material of the specified type in solid phase during normal operation temperature of the x-ray laser may be placed in reservoir 14 and liquefied by heating filament 18.

FIG. 3B is an alternative embodiment for forming a liquid edge-shape anode structure in accordance with the present invention. The embodiment of FIG. 3B is similar to that of FIG. 3A except that a trough-shape neck 32 with a narrow chink is used as the edge-shape anode to supply liquid material 16 for forming liquid edge 2. Trough-shape neck 32 comprises a material, preferably Tungsten, having a melting point higher than that of liquid material 16. Trough-shape neck 32 does not react with but is wetted by liquid material 16. The width of chink of neck 32 is in the range from 0.1 $\mu$m to 1000 $\mu$m.

FIG. 3C illustrates yet another alternative embodiment for forming a liquid edge-shape anode structure in accordance with the present invention. A chamber housing 36 has a trough-shape opening 37 at its bottom where a edge-shape anode 38 is placed. Edge-shape anode 38 comprises a molded sintered metal or alloy selected from the materials for edge-shape anode 20 listed above in the description of FIG. 2A. Sintered edge-shape anode 38 has a porosity capable of feeding the liquid material through its body. Chamber 36 comprises a material, preferably Tungsten, having a melting point higher than that of liquid material 16 and is substantially unreactive with liquid material 16.

Figures 4A, 4B:
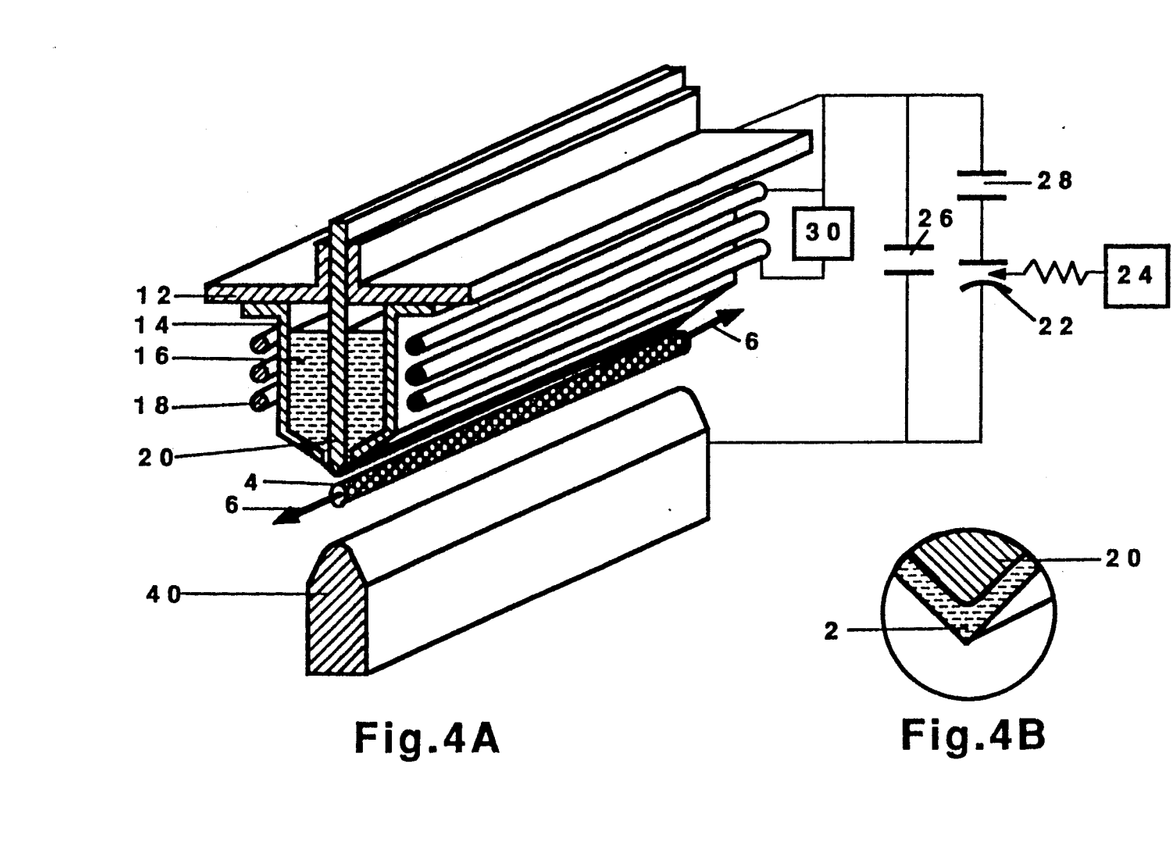

FIGS. 4A and 4B are an alternative embodiment of the apparatus for generating x-ray and/or EUV laser in accordance with the present invention. The embodiment of FIGS. 4A and 4B is similar to that of FIGS. 2A and 2B except that flat cathode 8 is replaced by an edge-shape cathode 40. This will form a better electrical field for focusing discharge current in the small space around liquid edge 2, thus increasing plasma density, uniformity and position stability.

Figures 5A, 5B:
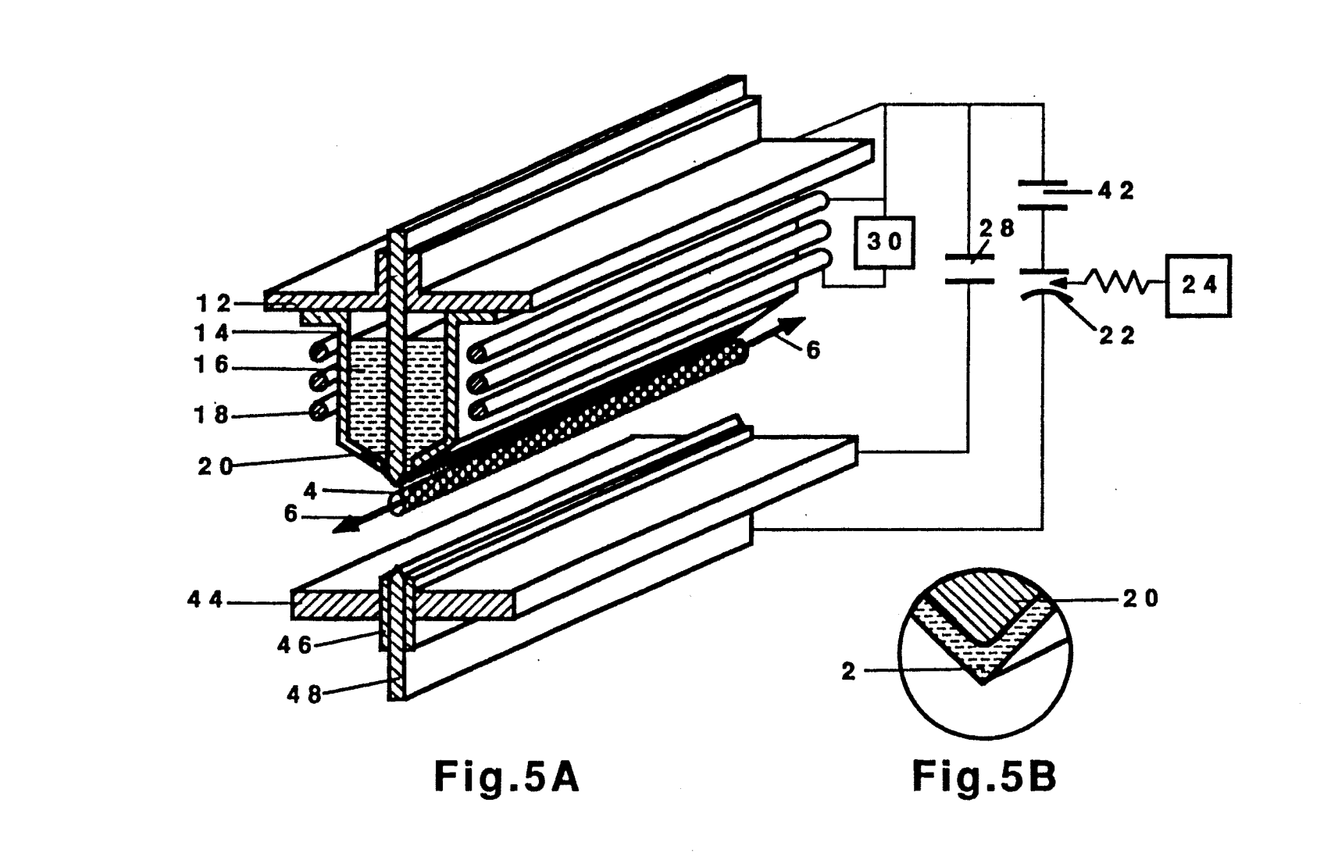

FIGS. 5A and 5B are a further embodiment of the apparatus for generating x-ray and/or EUV laser in accordance with the present invention. The embodiment of FIGS. 5A and 5B are similar to that of FIGS. 2A and 2B except that cathode 8 is replaced by a cathode 44 and a trigger electrode 48. Trigger electrode 48 is insulated from cathode 44 by two insulating plates 46. First, capacitor 28 with large capacitance is charged to a high voltage which is not higher than vacuum discharge threshold. On this voltage, edge-shape anode 20 wet by liquid material 16 will form liquid edge 2. Then a capacitor 42 is charged to a high voltage which is higher than vacuum discharge threshold. When capacitor 42 has been charged, a pulse from high voltage trigger generator 24 turns on spark gap switch 22 therefore cause the first vacuum discharge in the space between trigger electrode 48 and liquid edge-shape anode 20. This vacuum discharge will trigger the second vacuum discharge with huge current between cathode 44 and liquid edge-shape anode 20 through capacitor 28, thus column plasma 4 is produced by the confinement of strong magnetic field induced by this huge discharge current. The advantage of this embodiment is that final discharge current is not limited by capacity of spark gap switch 22 as in FIG. 2A. This embodiment is useful when a relatively huge discharge current is needed.

Figures 6A, 6B:
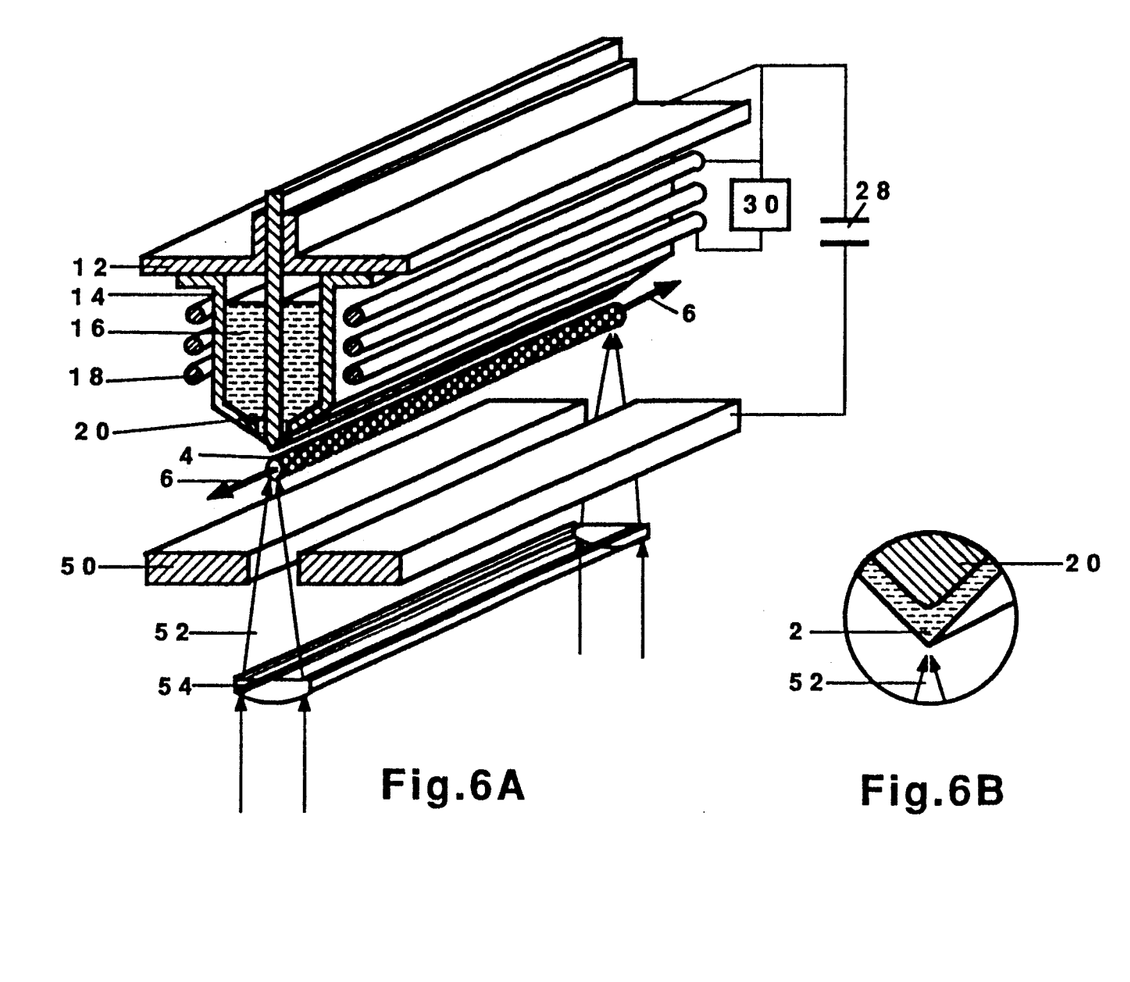

FIGS. 6A and 6B show still a further embodiment of the apparatus for generating x-ray and/or EUV laser in accordance with the present invention. The embodiment of FIGS. 6A and 6B is similar to that of FIGS. 2A and 2B except that the discharge is triggered by a focused laser beam 52. First, capacitor 28 is charged to a high voltage which is not higher than vacuum discharge threshold. Then a conventional laser beam 52 is focused to liquid edge 2 by an optical lens system 54. Focused laser beam 52 will evaporate liquid material 16 in liquid edge 2, which will trigger vacuum discharge in the space between a cathode 50 and liquid edge-shape anode 20. Column plasma 4 will form in the space near liquid edge 2 by the confinement of strong magnetic field induced by the huge discharge current, and x-ray and/or EUV laser 6 will emit from column plasma 4.

Figure 7:
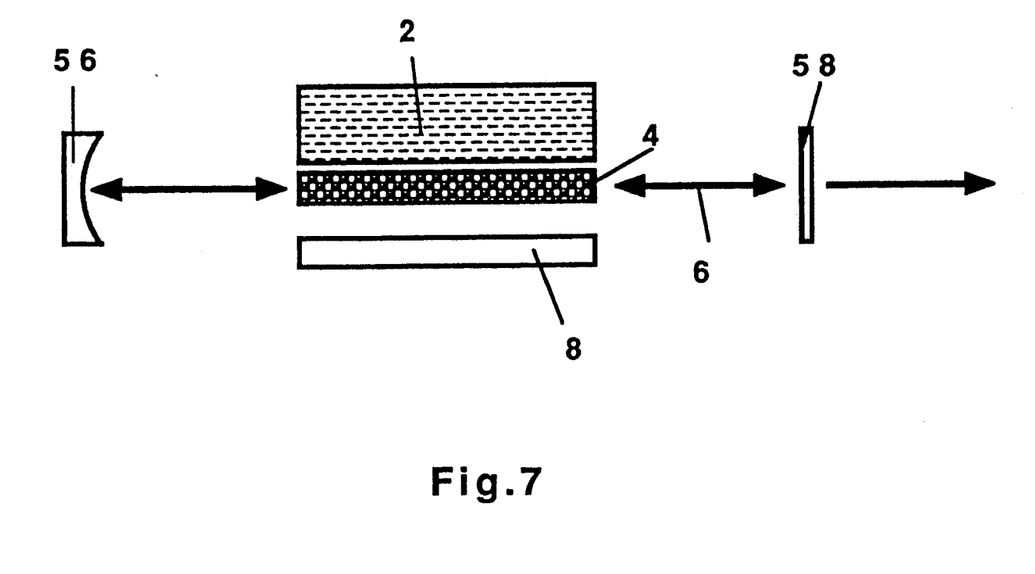
FIG. 7 is a schematic view of a x-ray and/or EUV laser with two mirrors in accordance with the present invention.

An optical resonator, constituted by two or more reflecting surfaces can be implemented to enhance the amplification of x-ray and/or EUV laser. FIG. 7 shows an embodiment of a x-ray and/or EUV laser with two mirrors in accordance with the present invention. Lasing x-rays 6 from plasma column 4 are reflected by a mirror 56, partially reflected by a beam splitter 58, and output through splitter 58.

Figure 8:
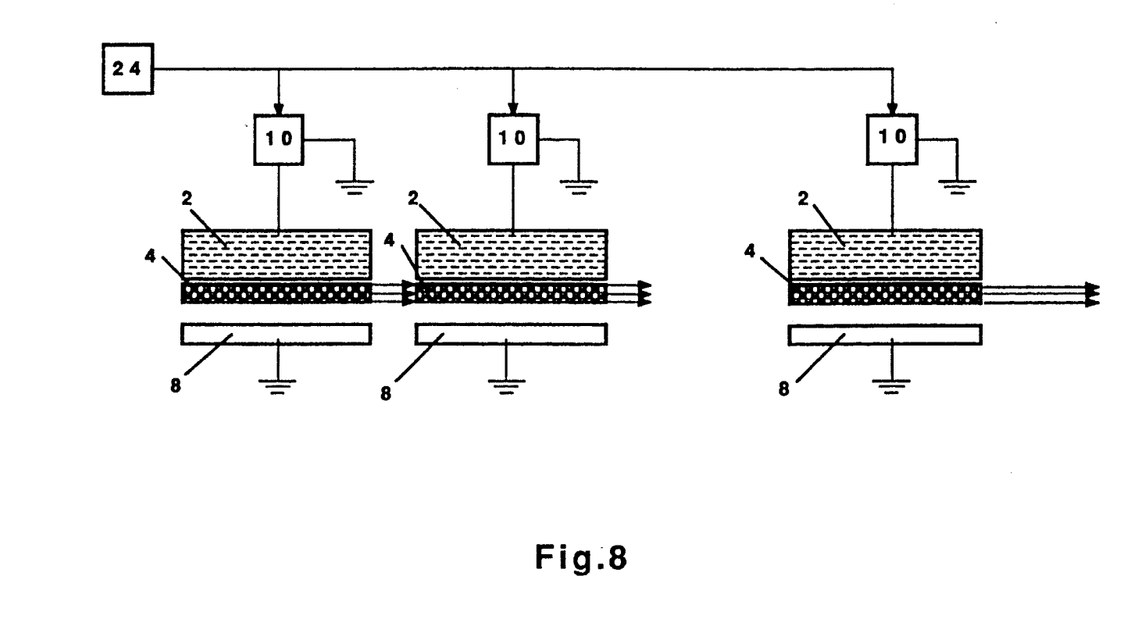
FIG. 8 is a schematic view of a large power x-ray and/or EUV laser consisting of multi-liquid edge-shape anodes placed in a straight line in accordance with the present invention.

FIG. 8 shows an embodiment of a large power x-ray and/or EUV laser consisting of multi-liquid edge-shape anodes placed in a straight line in accordance with the present invention. N liquid edge-shape anodes are placed in a straight line and operated in a traveling-wave mode. Each liquid edge-shape anode is driven by one pulse power supply 10. There is a time delay between two current pulses delivered to any adjacent liquid edge-shape anodes. The time delay is equal to the distance between corresponding liquid edge-shape anodes divided by the velocity of light. In this way, the X-ray lasing emission in one plasma column is stimulated by X-ray beam lased from the former plasma column. So that X-ray laser is amplified when passing each plasma column. The advantage of this new concept laser is no reflective mirror, i.e. no mirror reflection loss happened as in the conventional resonators. This will significantly increase the efficiency and power of X-ray laser, especially in x-ray wavelength range because of lack of qualified x-ray mirrors. Next, let us consider the output power of the multi-column X-ray laser.

Assuming the gain-length product, GL, to be the same for each plasma column, the X-ray laser power after each plasma column can be written as, First plasma column:
$$I_1 = S(e^{GL} - 1) \tag{1}$$

where, $S$ is a constant.

Second plasma column:
$$I_1 e^{GL} < I_2 < I_1(1 + e^{GL}) = I_2' \tag{2}$$

Third plasma column:
$$I_1 e^{2GL} < I_3 < I_2' + I_1(e^{GL})^2 = I_1(1 + e^{GL} + e^{2GL}) = I_3' \tag{3}$$

N-th plasma column:
$$I_1 e^{(N-1)GL} < I_N < I_{N-1}' + I_1(e^{GL})^{N-1} = \tag{4}$$

-continued
$$I_1(1 + e^{GL} + e^{2GL} + \ldots + e^{(N-1)GL})$$

where, the left side of the i-th equation is the case assuming that the X-ray emitted from plasma column (i−1) only stimulates the plasma column (i) and disperses before reaching plasma column (i+1), and the right side of the i-th equation is the case assuming that the X-ray emitted from plasma column (i−1) stimulates all plasma column after column (i−1), i.e. no beam dispersion. For a gain-length product GL=2, 3; N=3, 5, 7, the ratio of the x-ray laser power output of the N-th plasma column to that of the first plasma column is calculated as shown in Table I.

TABLE I

| N | Calculated laser power output | |
|---|---|---|
|   | GL = 2 | GL = 3 |
| 3 | $5.4 \times 10^1 \sim 6.30 \times 10^1$ | $4.03 \times 10^2 \sim 4.25 \times 10^2$ |
| 5 | $2.98 \times 10^3 \sim 3.45 \times 10^3$ | $1.63 \times 10^5 \sim 1.71 \times 10^5$ |
| 7 | $1.63 \times 10^5 \sim 1.88 \times 10^5$ | $6.57 \times 10^7 \sim 6.91 \times 10^7$ |

From the above table, we can see that a extremely large power X-ray laser can be built by using the multi-plasma-column x-ray laser.

FIG. 8 also shows the power supply system for driving multi-plasma-column x-ray laser. Each x-ray laser is driven by one pulse power supply 10. All power supplies are triggered by one trigger generator 24 through the lines with different lengths. The length difference between the two lines of any two column x-ray lasers is set to be equal to the distance between the corresponding two column x-ray lasers. In this way, multi-plasma-column x-ray laser can be operated in traveling-wave mode.

Similar to the trigger method described in FIGS. 6A and 6B, the multi-plasma-column x-ray laser also can be triggered by multi-laser-beams, each of which delivers one pulse laser beam to evaporate the liquid material on each liquid edge-shape anode in a time sequence, time interval between two adjacent pulse laser beam is set to be equal to the distance between the corresponding adjacent liquid edge-shape anodes divided by the velocity of light.

It is to be understood that embodiments described herein are merely illustrative of the principle of the invention. Various modifications and changes may be made thereto by persons skilled in the art which will embody the principle of the invention and fall within the spirit and scope thereof.

What is claimed is:

1. An apparatus for producing x-ray and/or EUV laser comprising:
   (1) a liquid edge-shape anode structure including: a liquid material, a reservoir for holding said liquid material, said reservoir having a trough-shape opening for passage of said liquid material, and liquid material feeding and liquid edge forming means operatively associated with said reservoir for feeding liquid material through the trough-shape opening in said reservoir and for forming a liquid edge from said liquid material;
   (2) a cathode electrode opposite said liquid edge-shape anode;
   (3) pulse power supply and electrical discharge circuit having a low impedance circuit configuration for providing a sufficient large current pulse passing through said liquid edge-shape anode and said cathode, which generates both a plasma and a magnetic field which helps confine said plasma to a thin column, said confined thin plasma column emits x-ray and/or ultraviolet laser.

2. The apparatus of claim 1 wherein said liquid material feeding and liquid edge forming means comprises a trough-shape neck with a narrow chink connected to said trough-shape opening for communicating with said reservoir, the liquid material passing through the narrow chink in said trough-shape neck and forming a liquid edge at the end of said trough-shape neck, said trough-shape neck being made of material having a melting point higher than that of said liquid material and substantially unreactive with said liquid material at the melting point of said liquid material.

3. The apparatus of claim 1 wherein said liquid material feeding and liquid edge forming means comprises an element having a edge-shape end, being made of a porous, sintered metal or metal alloy and communicating with the liquid material by the opening in said reservoir, the liquid material passing through said element and forming a liquid edge at the edge-shape end of said element.

4. The apparatus of claim 1 wherein said liquid material feeding and liquid edge forming means comprises a solid plate having a edge-shape end, being disposed in said reservoir and projecting through said opening, the liquid material wetting and flowing on the surfaces of said solid plate and forming a liquid edge at the edge-shape end of said solid plate, said solid plate being made of material having a melting point higher than that of said liquid material and substantially unreactive with said liquid material at the melting point of said liquid material.

5. The apparatus of claim 1 wherein said liquid material contains an atomic element which radiates laser light produced by said apparatus.

6. The apparatus of claim 5 wherein said liquid material further contains a heavy atomic element which is capable of providing a large radiation cooling rate for the plasma column produced by said apparatus.

7. The apparatus of claim 1 which further comprises environment of a gas of a heavy atom which is capable of providing a large radiation cooling rate for the plasma column produced by said apparatus.

8. The apparatus of claim 1 wherein said cathode is planar.

9. The apparatus of claim 1 wherein said cathode is shaped in the form of an edge.

10. The apparatus of claim 1 wherein said cathode comprises a trigger electrode for triggering discharge, and a main electrode for passing discharge current, said trigger electrode being electrically isolated from said main electrode by insulators.

11. The apparatus of claim 1 wherein said pulse power supply and electrical discharge circuit comprise capacitors, a spark gap switch, a trigger generator, and transmission lines.

12. The apparatus of claim 1 wherein said liquid edge-shape anode structure further comprises a heating means for heating said liquid material which is in solid phase during normal operation temperature of said apparatus.

13. The apparatus of claim 1 which further comprises a reflecting mirror located at one end of axis of said plasma column for reflecting laser radiation through said plasma column, and a partially reflected beam splitter located at the other end of axis of said plasma column for reflecting laser radiation through said plasma column and outputting laser radiation.

14. The apparatus of claim 1 which further comprises a conventional laser system being capable to deliver an optical laser pulse onto said liquid edge for evaporating the liquid material on said liquid edge, which triggers a vacuum discharge between said liquid edge-shape anode and said cathode.

15. A method for producing x-ray and/or EUV laser comprising:
   (1) providing an anode means having a liquid edge;
   (2) providing a cathode electrode opposite said liquid edge;
   (3) providing a pulse power supply and electrical discharge circuit having a low impedance circuit configuration for providing a sufficient large current pulse passing through said anode means and said cathode, which generates both a plasma and a magnetic field which helps confine said plasma to a thin column, a population inversion is created in said plasma column which results in emission of x-ray and/or ultraviolet laser.

16. The method of claim 15 wherein the inducing of the plasma process that generates the population inversion is by means of plasma inducing process selected from the group comprising electron-collisional excitation, electron-ion recombination, photoexcitation, photoionization, and charge transfer.

17. The method of claim 15 wherein the inducing of the plasma process that generates the population inversion is by means of electron-ion recombination and the plasma cools at a termination of a current pulse following electron heat conduction to said liquid edge.

18. The method of claim 15 wherein the inducing of the plasma process that generates the population inversion is by means of electron-ion recombination and the plasma cools by radiation from a highly ionized material.

19. The method of claim 15 wherein the plasma process that generates the population inversion is electron-ion recombination and laser results from a population inversion in a hydrogenic ion.

20. The method of claim 15 wherein the plasma process that generates the population inversion is electron-ion recombination and laser results from a population inversion in a helium-like ion.

21. The method of claim 15 wherein the plasma process that generates the population inversion is electron-ion recombination and laser results from a population inversion in a lithium-like ion.

22. The method of claim 15 wherein the plasma process that generates the population inversion is electron-collisional excitation and laser results from a population inversion in a nickel-like ion.

23. The method of claim 15 wherein the plasma process that generates the population inversion is electron-collisional excitation and laser results from a population inversion in a neon-like ion.

24. The method of claim 15 wherein the radiation from said plasma column produces x-ray and/or EUV laser action by photoexcitation.

25. The method of claim 15 wherein the radiation from said plasma column produces x-ray and/or EUV laser action by photoionization.

26. The method of claim 15 wherein the radiation from said plasma column produces x-ray and/or EUV laser action by charge transfer.

27. The method of claim 15 wherein said plasma column has a hot plasma part near the core of said plasma column, x-ray or EUV radiation from said hot plasma part excites or ionizes lower ionized atoms, or atoms from different species in cooler plasma part that close to said liquid edge-shape anode, thus the laser action in the cooler plasma part is created.

28. The method of claim 15 wherein said plasma column has a cooler plasma part near said liquid edge, diffusion of ions from the hot plasma part into the cooler plasma part creates the laser action.

29. An apparatus for producing large power x-ray and/or EUV laser comprising:
   (1) multi-liquid edge-shape anodes placed in a straight line; each liquid edge-shape anode including: a liquid material, a reservoir for holding said liquid material, said reservoir having a trough-shape opening for passage of said liquid material, and liquid material feeding and liquid edge forming means operatively associated with said reservoir for feeding liquid material through the trough-shape opening in said reservoir and for forming a liquid edge from said liquid material;
   (2) a cathode electrode opposite said multi-liquid edge-shape anodes;
   (3) multi-pulse power supplies and electrical discharge circuits, each pulse power supply and electrical discharge circuit having a low impedance circuit configuration for providing a sufficient large current pulse passing through one liquid edge-shape anode and said cathode, which generates both a plasma and a magnetic field which helps confine the plasma to a thin column, said confined thin plasma column emits x-ray and/or ultraviolet laser, there is a time delay between two current pulses delivered to any adjacent liquid edge-shape anodes, and said time delay is equal to distance between corresponding adjacent liquid edge-shape anodes divided by the velocity of light.

30. The apparatus of claim 29 wherein said multi-pulse power supplies are triggered by one trigger generator through lines with different lengths, the length difference between two adjacent lines is set to be equal to the distance between corresponding adjacent liquid edge-shape anodes.

31. The apparatus of claim 29 wherein said multi-pulse power supplies are triggered by multi-laser-beams, each of which delivers one pulse laser beam to evaporate liquid material on each liquid edge in a time sequence, time interval between two adjacent pulse laser beams is set to be equal to the distance between corresponding adjacent liquid edge-shape anodes divided by the velocity of light.

* * * * *